United States Patent [19]

Hummert et al.

[11] 4,376,615
[45] Mar. 15, 1983

[54] ELECTROMAGNETIC PUMP

[75] Inventors: George T. Hummert, Oakmont; Ian R. McNab, Murrysville, both of Pa.

[73] Assignee: Westinghouse Electric Corp., Pittsburgh, Pa.

[21] Appl. No.: 97,274

[22] Filed: Nov. 26, 1979

[51] Int. Cl.³ .............................................. H02N 4/20
[52] U.S. Cl. ..................................................... 417/50
[58] Field of Search ................... 417/50; 310/11, 181, 310/268; 313/231.31, 231.41

[56] References Cited

U.S. PATENT DOCUMENTS

| | | |
|---|---|---|
| 2,655,107 | 10/1953 | Godbold . |
| 2,715,190 | 8/1955 | Brill . |
| 2,741,984 | 4/1956 | Lindenblad . |
| 2,756,678 | 7/1956 | Collins . |
| 2,764,095 | 9/1956 | Baker . |
| 2,787,219 | 4/1957 | Werner . |
| 2,811,107 | 10/1957 | Brill . |
| 2,811,923 | 11/1957 | Barnes . |
| 2,928,349 | 3/1960 | Findlay . |
| 3,007,413 | 11/1961 | Blake . |
| 3,045,599 | 7/1962 | Carlson et al. . |
| 3,115,837 | 12/1963 | Campana . |
| 3,116,693 | 1/1964 | Rocklin .............................. 417/50 |
| 3,133,213 | 5/1964 | Edgar . |
| 3,198,119 | 8/1965 | Mead . |
| 3,238,715 | 3/1966 | Reader et al. . |
| 3,293,466 | 12/1966 | Henry-Baudot ................ 310/268 X |
| 3,296,471 | 1/1967 | Cochardt ........................ 310/181 X |
| 3,302,573 | 2/1967 | Ledeen . |
| 3,505,550 | 4/1970 | Levoy et al. ........................ 310/11 |

FOREIGN PATENT DOCUMENTS 799546 8/1958 United Kingdom .
1174961 12/1969 United Kingdom .

Primary Examiner—Carlton R. Croyle
Assistant Examiner—Edward Look
Attorney, Agent, or Firm—L. A. DePaul

[57] ABSTRACT

The electromagnetic pump comprises specially shaped magnetic pole extensions disposed around the duct along the line of flow of the fluid. The pole extensions increase the magnetic field along the axial center line of the duct, thereby increasing the mid-duct fluid body forces which in turn increase mid-duct velocity. The pole extensions decrease both viscous drag along the electrode walls and turbulent mixing in the exit regions of the duct. Both of these reductions increase pump efficiency. Moreover, the nearly uniformed velocity profile obtained with these pole extensions reduces current leakage in the end regions of the electrodes.

5 Claims, 5 Drawing Figures

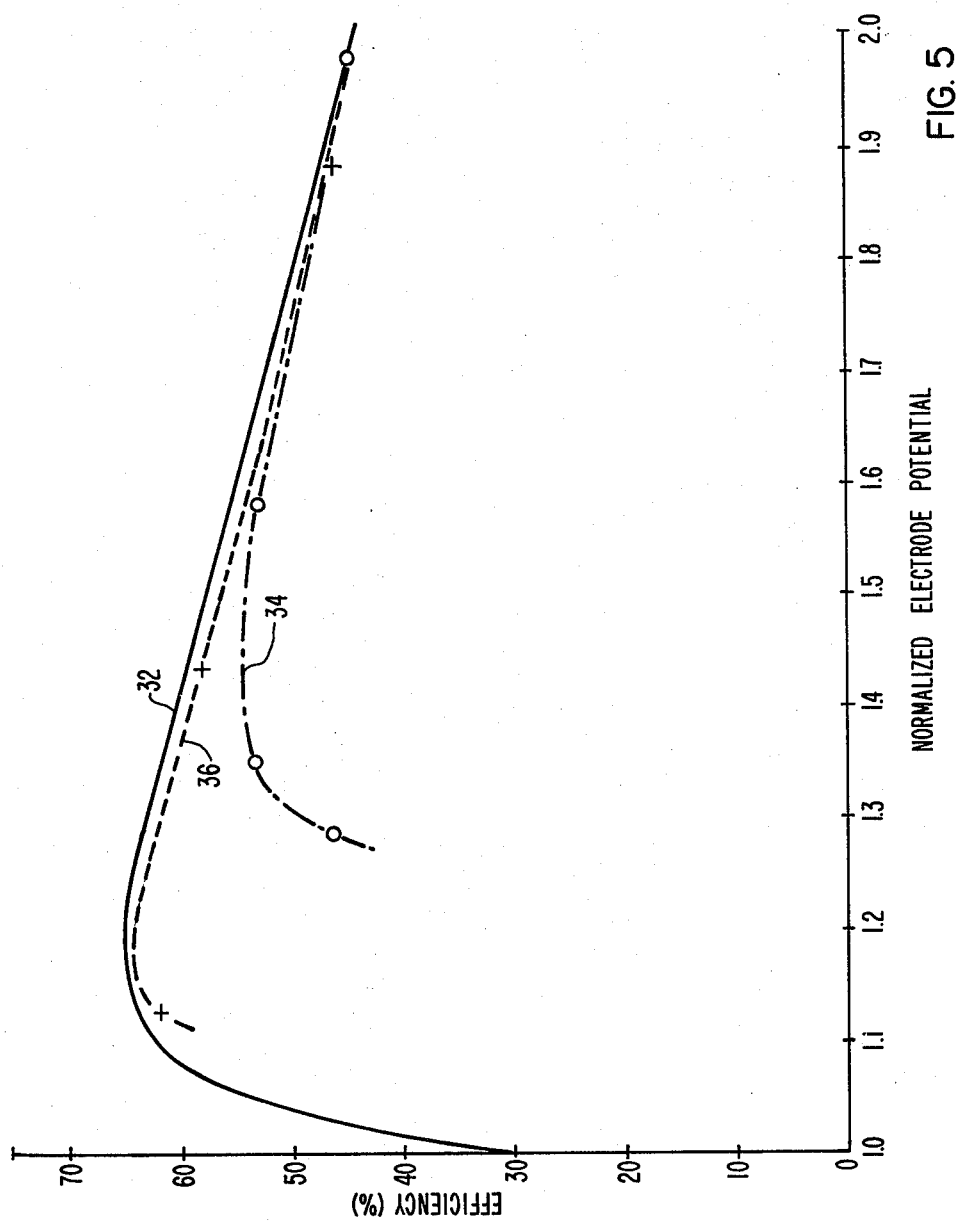

ELECTROMAGNETIC PUMP

BACKGROUND OF THE INVENTION

This invention is related to electromagnetic pumps and more particularly to direct electromagnetic pumps having pole extensions for improving the efficiency of the pump.

As is well known in the art, electromagnetic pumps produce a pressure differential or a pressure head between the inlet and the outlet through the interaction of an electrical current and a crossed magnetic field. This interaction produces an electromagnetic force density throughout the volume of the fluid within the pump region wherever both the current density and the magnetic field are non-zero. At each such point, this force is proportional not only to the magnitude of the current density and magnetic field, but also to their relative orientation. The maximum force density and resulting pressure differential occurs when the electrical current and the magnetic field are mutually perpendicular to each other and to the direction of fluid flow.

Typically, the electromagnetic pumps are constructed in a rectangular duct by mounting two electrodes flush with the opposite side walls of the duct and placing the other two walls between magnetic pole faces. When the two electrodes are connected to an external power supply, current flows across the duct and interacts with the magnetic field to produce the axially directed body force and pressure difference across the duct. The pump's inlet and exit regions are defined roughly by the electrode edges. These regions may vary somewhat depending upon the relative location of the magnetic pole face edges. In an ideal pump, all the current would be confined to the duct volume enclosed by the electrodes and the pole faces where the force density is the greatest. In an actual pump, however, some current leaks into the magnetic fringe region both upstream and downstream from the electrode edges. This tends to lower pump efficiency. Thus, current leakage in the magnetic fringe regions adds little to the overall pressure differential while increasing the current flow thereby diminishing efficiency.

One technique often discussed in the literature for improving efficiency is to extend or "grade" the magnetic field decay such that a gradually diminishing back emf is established that tends to oppose leakage current. In should be noted that, simply extending the magnetic pole faces in order to extend the region of high field intensity beyond the electrode edges does not necessarily improve efficiency. Simply extending the high interpole field region, in fact, may be counter productive since the increased field beyond the electrodes may create a back emf greater than the applied electrical potential thereby producing reverse circulating currents and a negative pressure gradient in the duct. A properly graded field, however, may reduce leakage currents while at the same time extracting a positive pressure contribution from the fringe regions.

In addition to the electromagnetic loss effects, viscous effects also contribute to power losses. It has been suggested that viscous effects coupled with electromagnetic body forces produce velocity profiles in the duct characterized by large axial velocities or jets near the electrodes that quickly diminish to a gradually sloped profile at positions away from the electrode walls and closer to the center line of the duct. In some circumstances, it is believed that the flow of the fluid may stagnate or even reverse along the center line of the duct under these conditions. Viscous-drag losses along the duct walls and the increased turbulence and complicated back flow along the duct center line lead to increased viscous dissipation and lower pump efficiency. Therefore, what is needed is an improved electromagnetic pump wherein electrical current leakage and viscous dissipation are reduced, thereby increasing pump efficiency.

SUMMARY OF THE INVENTION

The electromagnetic pump comprises specially shaped magnetic pole extensions disposed around the duct along the line of flow of the fluid. The pole extensions increase the magnetic field along the axial center line of the duct, thereby increasing the mid-duct fluid body forces which in turn increases mid-duct velocity. The pole extensions decrease both viscous drag along the electrode walls and turbulent mixing in the exit regions of the duct. Both of these reductions increase pump efficiency. Moreover, the more uniform velocity profile obtained with these pole extensions reduces current leakage in the end regions of the electrodes.

BRIEF DESCRIPTION OF THE DRAWINGS

While the specification concludes with claims particularly pointing out and distinctly claiming the subject matter of the invention, it is believed the invention will be better understood from the following description taken in conjunction with the accompanying drawings, wherein:

FIG. 5 is a graph showing the efficiencies of the tapered pole extensions.

DESCRIPTION OF THE PREFERRED EMBODIMENT

Figure 1:
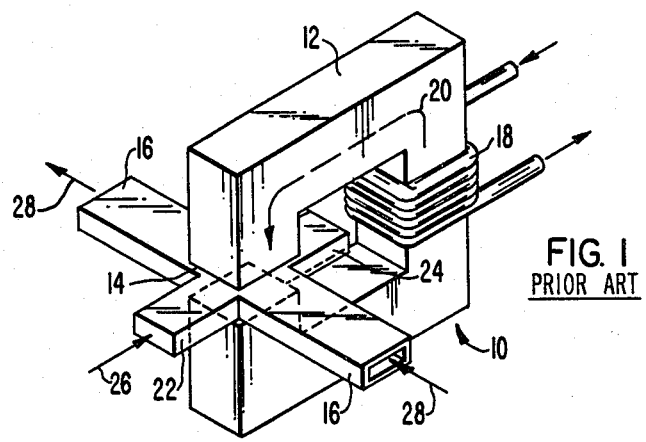
FIG. 1 is a view in perspective of a typical electromagnetic pump.

Referring to FIG. 1, a typical electromagnetic pump referred to generally as 10 comprises a magnetic core 12 having a gap 14 through which is disposed a metal duct 16 which is generally rectangular in cross-section. An energizing coil 18 is disposed around at least a portion of magnetic core 12 such that when an electric current flows through energizing coil 18 a magnetic flux 20 is established in magnetic core 12. Duct 16 is arranged such that it fits closely in gap 14 and contacts magnetic core 12 on the upper and lower sides of duct 16. A first electrode 22 is disposed in contact with one side of duct 16 while a second electrode 24 is disposed in contact with the other side of duct 16 as shown in FIG. 1. Both first electrode 22 and second electrode 24 have the same height as duct 16. In an electromagnetic pump such as electromagnetic pump 10, the fluid flowing through duct 16 is chosen such that it has electromagnetic conductive properties. Such fluids may comprise liquid sodium, liquid sodium-potassium mixtures, liquid potassium, mercury and even less conductive fluids such as salt water and ionized gases. Since the fluid flowing through duct 16 is electrically conductive, when a current 26 is established between first electrode 22 and second electrode 24 and when magnetic flux 20 is established as shown in FIG. 1, a body force is established on the liquid in duct 16 such that the liquid is caused to flow through duct 16 in the direction of arrow 28, all in a manner well understood in the art.

As described above, when the current and magnetic flux are properly established in a perpendicular relationship to each other and to the flow of fluid, the flow of fluid through duct 16 is enhanced. However, it has been found that the flow of current from first electrode 22 to second electrode 24 does not necessarily pass directly therebetween. Since the fluid flowing in duct 16 is electrically conductive, the flow of current from first electrode 22 may flow through a portion of duct 16 and fluid that does not lie directly between first electrode 22 and second electrode 24. This is commonly referred to as "fringe current". Likewise, edge effects at the corners of the magnetic core cause magnetic flux to pass through duct 16 at portions outside the direct path of magnetic core 12 which is generally referred to as "fringe field". In an ideal pump, all the current and magnetic flux would be confined to the duct volume enclosed by the electrodes and the pole faces where the force density is greatest because this is the area wherein the current, the flux, and the flow of fluid are mutually perpendicular. Thus, the flux leakage and current leakage passing outside of this region tends to reduce the pump efficiency. Not only does this leakage tend to reduce the pump efficiency, but it also tends to create turbulent flow in duct 16 which further reduces pump efficiency. Under certain circumstances, the leakage of current and flux tends to establish large axial velocities or jets of fluid near the electrodes that quickly diminish to a gradually sloped profile at positions away from the electrode walls and closer to the center line of the duct 16. There is some evidence to suggest that under certain circumstances the flow of fluid through duct 16 may stagnate or even reverse along the center line of duct 16.

Figure 2:
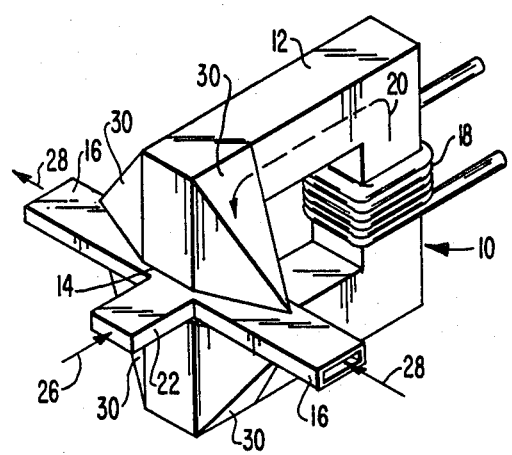
FIG. 2 is a view in perspective of an electromagnetic pump having triangular pole extensions.

Referring now to FIG. 2, the improved electromagnetic pump 10 comprises similar elements as shown in FIG. 1 and described above with the addition that magnetic core 12 has pole face extensions that extend along the longitudinal axis of duct 16 and in the direction of the flow of fluid in duct 16. As shown in FIG. 2, the pole extensions may comprise a triangularly shaped pole extension 30 which may be an integral portion of magnetic core 12 and is located along the longitudinal axis of duct 16 both above and below duct 16. The pole extensions increase the magnetic field along the axial center line of duct 16, thereby increasing the mid-duct fluid body forces which in turn increases mid-duct velocities. Increasing the mid-duct velocities decreases the likelihood that the flow of fluid through duct 16 will stagnate or reverse along the center line. The net effect is a flattening of the velocity profile to achieve a more uniform flow across the duct 16. For a given flow rate, the non-uniform magnetic field extensions produced by the pole extensions decreases both viscous drag along the electrode walls and turbulent mixing in the exit regions of duct 16. Both of these reductions increase pump efficiency. Moreover, the nearly uniform velocity profile obtained with these pole extensions produces a more uniform flow of current along the axial center line and the fringe regions thereby reducing end current leakage. It should be noted, however, that extending the pole extensions too far into the fringe region will lead to reverse circulating currents and attendant negative pressure zone. In short, there is a point of diminishing returns to the pole extensions. Extending the pole extensions too far beyond the electrodes produces local back emf's greater than the applied fields such that the gains in efficiencies obtained through the reduction of viscous drag and turbulent mixing is offset by increased circulating current. Therefore, it is recommended that the area of each of the two magnetic pole extensions be approximately 5% to 25% of the area of the normal magnetic pole. In addition, the maximum length of the pole extension should be approximately 5% to 25% of the total length of the electrode normal magnetic pole length.

Figure 3:
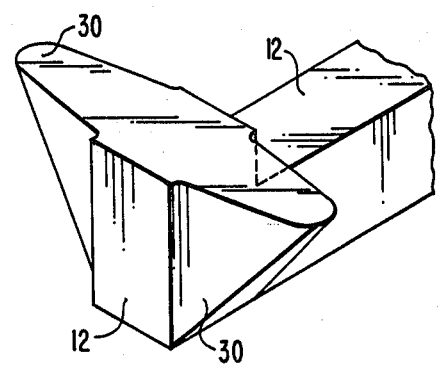
FIG. 3 is a partial view in perspective of an electromagnetic pump having bell shaped pole extensions.
Figure 4:
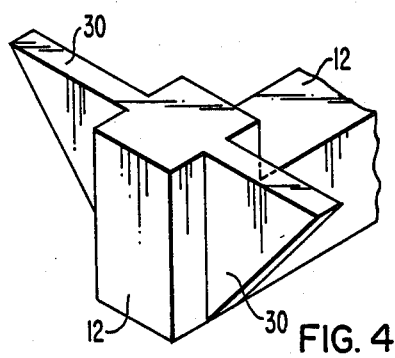
FIG. 4 is a view in perspective of an electromagnetic pump having rectangular pole extensions.

Referring now to FIGS. 3 and 4 the magnetic pole extensions need not be triangularly shaped as shown in FIG. 2, but may also be bell shaped as shown in FIG. 3 or rectangular shaped as shown in FIG. 4. The specific choice of the particular shape of the pole extension may depend upon the particular application.

FIG. 5 is a graph of electromagnetic pump efficiency versus normalized electrode potential for a 10–60 gallon per minute pump using a current input of 3.5 KA. The normalized electrode potential is the voltage between electrodes divided by the product of the average magnetic flux density, electrode separation, and average fluid velocity. First line 32 indicates the theoretical efficiency curve and assumes a uniform cross-sectional velocity profile in duct 16. Second line 34 shows the results of a test run without a tapered pole using a device similar to the one shown in FIG. 1. Third line 36 indicates the test results derived from a test utilizing a tapered pole extension of the type shown in FIG. 2. As can be seen, the tapered pole extensions create a dramatic increase in pump efficiency which very closely approaches theoretical pump efficiency.

Therefore, the invention provides an improved electromagnetic pump wherein current losses, magnetic losses, and flow turbulence are minimized thereby greatly increasing pump efficiency.

We claim as our invention:

1. An electromagnetic pump comprising:
 a duct;
 an electrically conductive fluid in said duct;
 electrode means disposed around said duct for establishing a flow of electric current through said duct; and
 magnetic core means disposed around said duct at approximately a 90° angle to said electrode means and extending beyond said electrode means and along the longitudinal axis of said duct with a maximum length of approximately 5 percent to 25 percent of the length of said electrode means for establishing a magnetic field through said duct and for reducing current, magnetic, and turbulent losses in said duct thereby increasing pump efficiency.

2. The electromagnetic pump according to claim 1 wherein the area of the extension of said magnetic core means beyond said electrode means is approximately 5 percent to 25 percent of the area defined between said electrode means and said magnetic core means.

3. The electromagnetic pump according to claim 2 wherein the portion of said magnetic core means extending beyond said electrode means is triangularly shaped.

4. The electromagnetic pump according to claim 2 wherein the portion of said magnetic core means extending beyond said electrode means is bell shaped.

5. The electromagnetic pump according to claim 2 wherein the portion of said magnetic core means extending beyond said electrode means is rectangularly shaped.

* * * * *